(12) United States Patent
Tian et al.

(10) Patent No.: US 11,132,528 B2
(45) Date of Patent: Sep. 28, 2021

(54) INFORMATION PROCESSING METHOD AND ELECTRONIC DEVICE

(71) Applicant: Lenovo (Beijing) Co., Ltd., Beijing (CN)

(72) Inventors: Xingfa Tian, Beijing (CN); Tongbin Ju, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/834,885

(22) Filed: Mar. 30, 2020

(65) Prior Publication Data

US 2020/0311382 A1 Oct. 1, 2020

(30) Foreign Application Priority Data

Mar. 31, 2019 (CN) .......................... 201910254421.X

(51) Int. Cl.
*G06K 9/00* (2006.01)
*G06F 21/32* (2013.01)
*G06F 3/041* (2006.01)

(52) U.S. Cl.
CPC ....... *G06K 9/00087* (2013.01); *G06F 3/0412* (2013.01); *G06F 3/041661* (2019.05); *G06F 21/32* (2013.01); *G06K 9/0004* (2013.01)

(58) Field of Classification Search
CPC .............. G06K 9/00087; G06K 9/0004; G06F 3/041661; G06F 3/0412; G06F 21/32
See application file for complete search history.

(56) References Cited

U.S. PATENT DOCUMENTS

| | | | |
|---|---|---|---|
| 2014/0267659 A1* | 9/2014 | Lyon | G06K 9/03 348/77 |
| 2018/0373917 A1* | 12/2018 | Sheik-Nainar | G06K 9/00912 |
| 2020/0034601 A1* | 1/2020 | Zhou | G06K 9/228 |
| 2020/0074142 A1* | 3/2020 | Yang | G06K 9/00087 |
| 2020/0242317 A1* | 7/2020 | Hu | G06K 9/00067 |

FOREIGN PATENT DOCUMENTS

| | | |
|---|---|---|
| CN | 106709405 A | 5/2017 |
| CN | 107194324 A | 9/2017 |
| CN | 107194331 A | 9/2017 |
| CN | 107346169 A | 11/2017 |
| CN | 107450712 A | 12/2017 |
| CN | 107728979 A | 2/2018 |
| CN | 109190589 A | 1/2019 |
| CN | 109313522 A | 2/2019 |

* cited by examiner

*Primary Examiner* — Stephen G Sherman
(74) *Attorney, Agent, or Firm* — Anova Law Group, PLLC

(57) ABSTRACT

An information processing method includes: obtaining a touch input occurred in a touch sensing area by a touch sensing circuit of a display screen of an electronic device; based on a sensing parameter of the touch input, determining an effective target area within a fingerprint collection area of an in-display fingerprint collection apparatus; and performing a fingerprint recognition process based on the touch input within the effective target area. The fingerprint collection area is smaller than or equal to the touch sensing area.

18 Claims, 8 Drawing Sheets

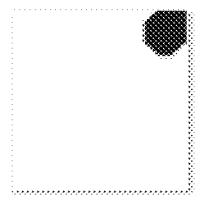 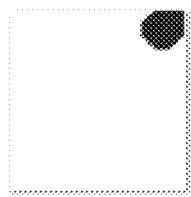 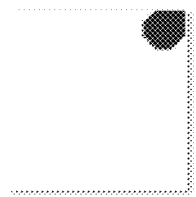

FIG. 7A    FIG. 7B    FIG. 7C

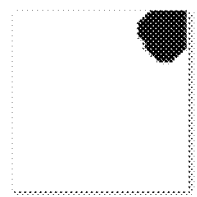 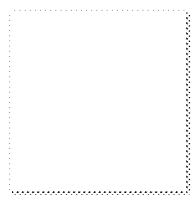 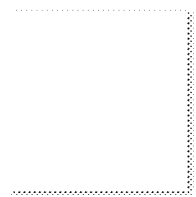

FIG. 7D    FIG. 7E    FIG. 7F

After the electronic device invokes the fingerprint collection apparatus, obtaining a fingerprint image of the touch input — 801

If the fingerprint image satisfies an overexposure condition, determining the effective target area based on the sensing parameter of a subsequent touch input and obtaining the fingerprint information of the subsequent touch input in the effective target area — 802

FIG. 8

INFORMATION PROCESSING METHOD AND ELECTRONIC DEVICE

CROSS-REFERENCE TO RELATED APPLICATION

This application claims the priority of Chinese Patent Application No. 201910254421.X, filed on Mar. 31, 2019, the entire content of which is incorporated herein by reference.

FIELD OF THE DISCLOSURE

The present disclosure generally relates to the field of electronics and, more particularly, relates to an information processing method and an electronic device.

BACKGROUND

Currently, on terminal devices such as smart phones, tablet computers, or personal digital assistants (PDA), user authentication based on fingerprint matching is widely adopted.

Fingerprint collection of a user is the first step for fingerprint based authentication. In the process of collecting the fingerprint, an optical fingerprint collection apparatus may be affected by an ambient light (especially under a high intensity ambient light), resulting overexposure of a collected fingerprint image. Correspondingly, the collected fingerprint image includes limited effective fingerprint information, thereby affecting the quality of the collected fingerprint image.

BRIEF SUMMARY OF THE DISCLOSURE

One aspect of the present disclosure provides an information processing method. The method includes: obtaining a touch input occurred in a touch sensing area by a touch sensing circuit of a display screen of an electronic device; based on a sensing parameter of the touch input, determining an effective target area within a fingerprint collection area of an in-display fingerprint collection apparatus; and performing a fingerprint recognition process based on the touch input within the effective target area. The fingerprint collection area is smaller than or equal to the touch sensing area.

Another aspect of the present disclosure provides an electronic device. The electronic device includes: a display screen having a touch sensing area; a fingerprint collection apparatus disposed under the display screen and including a fingerprint collection area; and a processor. The fingerprint collection area is smaller than or equal to the touch sensing area. The processor is configured to perform: obtaining a touch input occurred in the touch sensing area by a touch sensing circuit of the display screen; based on a sensing parameter of the touch input, determining an effective target area within the fingerprint collection area; and performing a fingerprint recognition process based on the touch input within the effective target area.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

FIGS. 7A-7F illustrate schematic diagrams of examples of overly-exposed fingerprint images according to some embodiments of the present disclosure.

FIG. 8 illustrates a flowchart of another example of an information processing method according to some embodiments of the present disclosure.

DETAILED DESCRIPTION

To describe the technical solutions more clearly and more completely, the embodiments of the present disclosure will be described with reference to the drawings. The described embodiments are only some but not all of the embodiments of the present disclosure. Based on the embodiments of the present disclosure, other embodiments obtained by a person of ordinary skill in the art without creative efforts shall fall within the protection scope of the present disclosure.

The present disclosure provides an information processing method and an electronic device, capable of avoiding overexposure of a fingerprint image collected by a fingerprint collection apparatus to certain extent, thereby ensuring the quality of the fingerprint image collected by the fingerprint collection apparatus. Hereinafter, the information processing method and the electronic device of the present disclosure will be described in detail in various embodiments.

Figure 1:
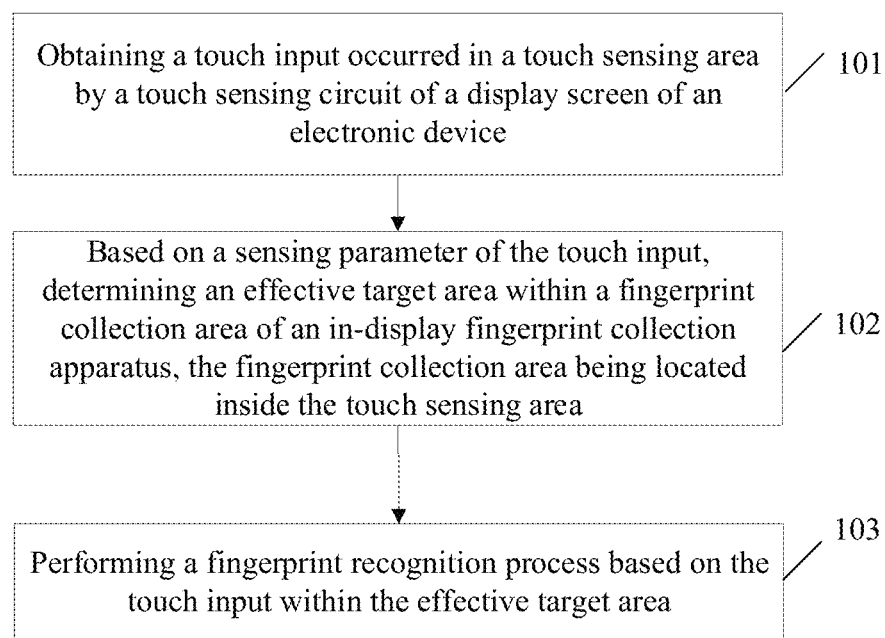
FIG. 1 illustrates a flowchart of an example of an information processing method according to some embodiments of the present disclosure.

FIG. 1 illustrates a flowchart of an example of an information processing method according to some embodiments of the present disclosure. The information processing method may be applied to, but is not limited to, portable terminal devices such as smart wrist devices, smartphones, tablet computers, and personal digital assistants, or personal computer devices such as laptop computers, all-in-one computers, and desktop computers, that include a display screen and a fingerprint collection apparatus.

In some embodiments, as shown in FIG. 1, the information processing method includes the following processes.

At 101, a touch input is obtained in a touch sensing area by a touch sensing circuit of a display screen of an electronic device. The electronic device may include the display screen and a fingerprint collection apparatus. An input position for the touch input is within the touch sensing area. The fingerprint collection apparatus may include an in-display or under-display sensor, e.g., a sensor embedded within or located underneath the display screen.

In some embodiments, the electronic device includes the display screen and the fingerprint collection apparatus.

The display screen includes a display output area and the touch sensing area of the touch sensing circuit. The display output area of the display screen and the touch sensing area of the display screen are consistent with each other (e.g., the two areas are substantially the same). The display screen may be, but is not limited to, a capacitive touch screen or a resistive touch screen, etc. Correspondingly, the touch sensing circuit may be, but is not limited to, a capacitive touch sensing circuit or a resistive touch sensing circuit.

The fingerprint collection apparatus may be a fingerprint sensor for collecting fingerprint information of a finger. In some embodiments, the fingerprint collection apparatus may be disposed at the bottom of the display screen. That is, the fingerprint collection apparatus is an in-display fingerprint collection apparatus.

The fingerprint collection apparatus includes a fingerprint collection area and a plurality of photosensitive elements. The fingerprint collection area is located inside the display output area and the touch sensing area. The fingerprint collection area is smaller than or equal to the display output area and the touch sensing area. For example, the fingerprint collection area may be a half-screen in-display fingerprint collection area or a full-screen in-display fingerprint collection area.

The plurality of photosensitive elements may be, but are not limited to, devices such as complementary metal oxide semiconductor (CMOS) and charge coupled device (CCD), capable of sensing light to form an image. A photosensitive area of the plurality of photosensitive elements in the touch sensing area forms the fingerprint collection area of the fingerprint collection apparatus.

In some embodiments, the touch input is obtained by the touch sensing circuit of the display screen. Specifically, the touch sensing circuit of the display screen obtains the touch input by a user's finger in the touch sensing area of the electronic device. For example, based on an actual fingerprint collection demand (such as fingerprint match for identity verification or fingerprint collection need for fingerprint information registration), the electronic device needs to collect user's fingerprint information. The user performs the touch input of the fingerprint in the touch sensing area of the electronic device. In this process, the touch sensing circuit of the display screen obtains the fingerprint of the touch input in the touch sensing area.

At 102, based on a sensing parameter of the touch input, an effective target area is determined within a fingerprint collection area of the fingerprint apparatus. The effective target area is located inside the touch sensing area.

At 103, a fingerprint recognition process is performed based on the touch input within the effective target area.

Specifically, the sensing parameter of the touch input is a sensing parameter obtained in the process that the display screen of the electronic device performs touch sensing of the touch input, corresponding to various types of electronic device display screens. The sensing parameter may be, but is not limited to, a capacitive touch sensing parameter obtained based on the capacitive touch technology or a resistive touch sensing parameter obtained based on the resistive touch technology.

The effective target area is determined based on the sensing parameter of the touch input. In some embodiments, based on the sensing parameter of the touch input, an effective operation area corresponding to the touch input is determined within the fingerprint collection area of the fingerprint collection apparatus. The effective operation area is an area within the fingerprint collection area of the fingerprint collection apparatus that actually performs a photosensitive sensing of the fingerprint information of the touch input.

In some embodiments, the effective target area is smaller than or equal to the fingerprint collection area of the fingerprint collection apparatus.

Based on the actual fingerprint collection demand (such as the fingerprint match for the identity verification or the fingerprint collection need for the fingerprint information registration), the electronic device invokes the fingerprint collection apparatus to collect the user's fingerprint information. The fingerprint collection apparatus uses the photosensitive elements in the fingerprint collection area to perform the photosensitive sensing on the user's touch input to collect the fingerprint image. To avoid the overexposure or near overexposure of the fingerprint image collected by the fingerprint collection apparatus, after the touch sensing circuit of the display screen obtains the touch input of the user's finger, the electronic device does not directly perform the fingerprint recognition process on the touch input in the fingerprint collection area of the fingerprint collection apparatus. Instead, based on the sensing parameter of the touch input, the electronic device determines the effective target area of the touch input within the fingerprint collection area of the fingerprint collection apparatus. In this way, only the effective target area within the fingerprint collection area rather than the entire collection area is used to perform the fingerprint recognition process.

Compared with using the entire collection area of the fingerprint collection apparatus to perform the fingerprint recognition process in the existing technology, only the effective target area of the touch input within the fingerprint collection area rather than the entire collection area is used to perform the fingerprint recognition process, thereby preventing the portion of the fingerprint collection area outside the effective target area from sensing ambient light signal. Correspondingly, the portion of the light signal is prevented from leaking into the effective target area, and the amount of ambient light intake in the effective target area is effectively reduced.

In the embodiments of the present disclosure, because the fingerprint recognition process is performed in the effective target area rather than the entire area within the fingerprint collection area, sensing the ambient light by the portion of the fingerprint collection area outside the effective target area is effectively prevented. Correspondingly, the portion of the light signal is prevented from leaking into the effective target area, and the amount of the ambient light intake in the effective target area is effectively reduced. Thus, the information processing method avoids the overexposure of the fingerprint image collected by the fingerprint collection apparatus to certain extent, and substantially ensures the quality of the fingerprint image collected by the fingerprint sensor.

Figure 2:
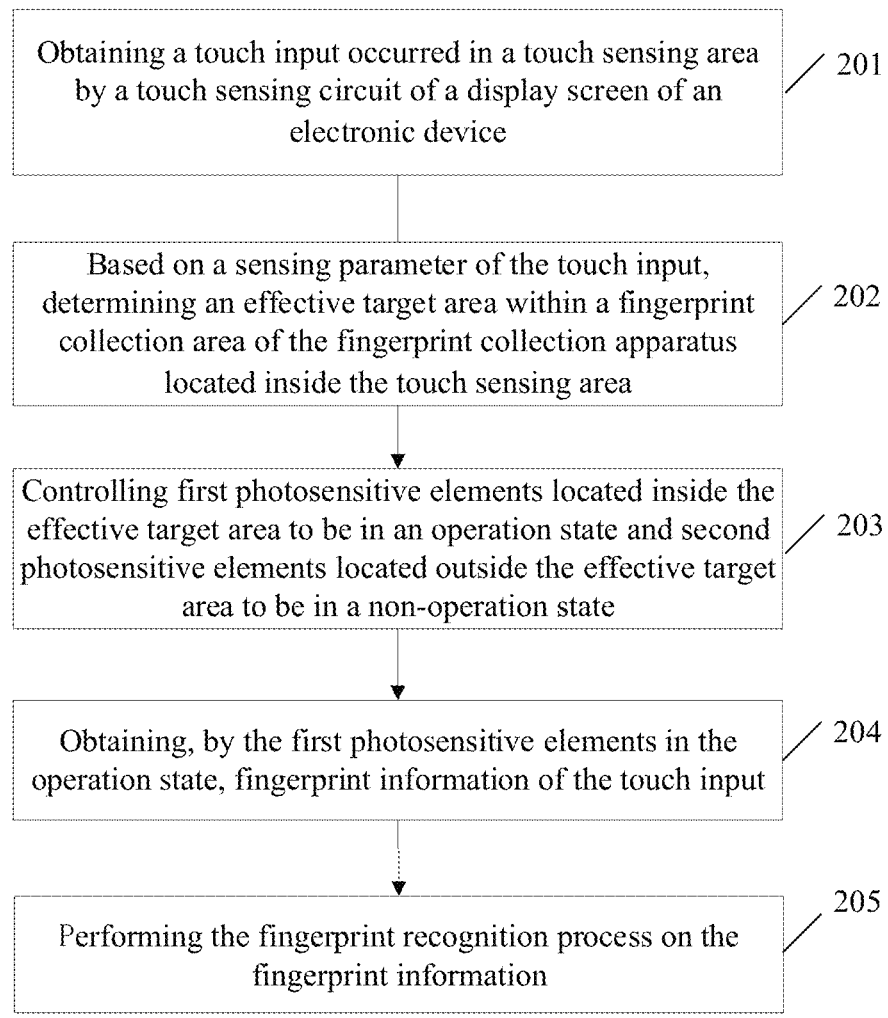
FIG. 2 illustrates a flowchart of another example of an information processing method according to some embodiments of the present disclosure.

In some embodiments, FIG. 2 illustrates a flowchart of another example of an information processing method according to some embodiments of the present disclosure. As shown in FIG. 2, the information processing method includes the following processes.

At 201, a touch input is obtained in a touch sensing area by a touch sensing circuit of a display screen of an electronic device, the device including the display screen and a fingerprint collection apparatus. An input position for the touch input is within the touch sensing area.

At 202, based on a sensing parameter of the touch input, an effective target area is determined within a fingerprint collection area of the fingerprint apparatus located inside the touch sensing area. The effective target area is a portion of the fingerprint collection area of the fingerprint collection apparatus. The fingerprint collection area is smaller than or equal to the touch sensing area.

The processes at 201 and 202 are the same as the previously described processes at 101 and 102. For the detail description, reference can be made to the description for the processes at 101 and 102.

At 203, first photosensitive elements of the fingerprint collection apparatus located inside the effective target area are controlled to be in an operation state and second photosensitive elements of the fingerprint collection apparatus located inside the effective target area are controlled to be in a non-operation state.

Specifically, the fingerprint collection apparatus includes the plurality of photosensitive elements, such as a plurality of CMOS or CCD photosensitive elements. The photosensitive area of the plurality of photosensitive elements forms the fingerprint collection area of the fingerprint collection apparatus.

Figure 3:
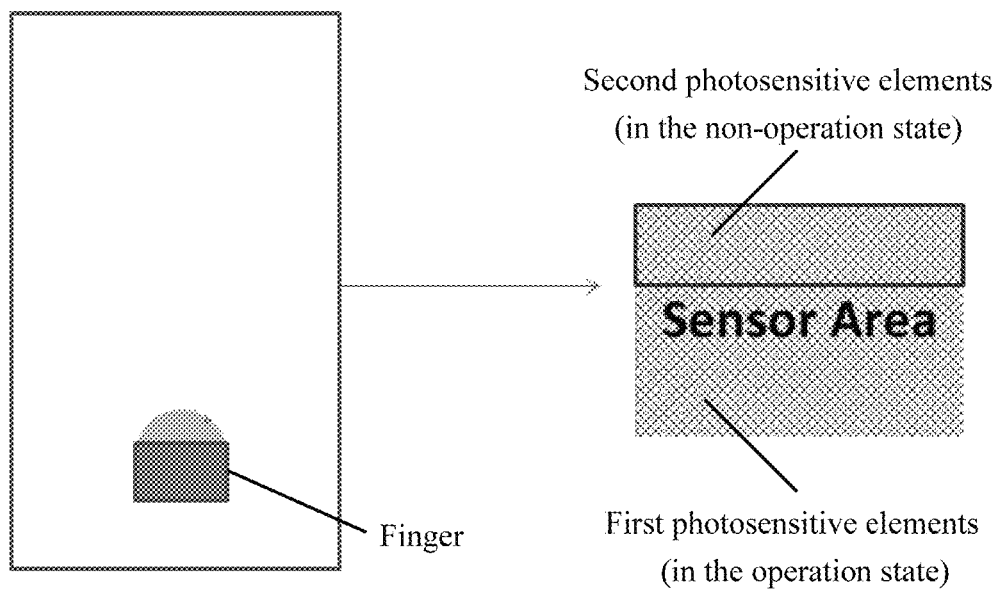
FIG. 3 illustrates a schematic diagram of controlling operation states of first photosensitive elements and second photosensitive elements according to some embodiments of the present disclosure.

Based on the sensing parameter of the touch input, the effective target area is determined within the fingerprint collection area of the fingerprint collection apparatus. For example, the effective operation area of the touch input is determined within the fingerprint collection area of the fingerprint collection apparatus. As shown in FIG. 3, on a display screen, a prompt area for instructing a user's finger touch input may be round or oval. The fingerprint collection apparatus, having a sensor area greater than or equal to the prompt area, may be embedded within or disposed under the display screen at the location corresponding to the prompt area. A finger may touch the display screen at the prompt area, covering just the rectangular region, and leaving the half-circle region above the rectangular uncovered and exposed to ambient light. As shown in the right figure of FIG. 3, the first photosensitive elements of the fingerprint collection apparatus located inside the effective target area (e.g., the rectangular region shown on the left) are controlled to be in the operation state and the second photosensitive elements of the fingerprint collection apparatus located outside the effective target area (e.g., the half-circle region shown on the left) are controlled to be in the non-operation state.

In some embodiments, when obtaining the fingerprint image, the display screen initially displays a fingerprint collection interface. At this time, the electronic device has not invoked the fingerprint collection apparatus to obtain the fingerprint image. The fingerprint collection process starts after the effective target area is determined. After the effective target area is determined and before the fingerprint collection process starts, the electronic device invokes the fingerprint collection apparatus. At this time, the electronic device controls the first photosensitive elements of the fingerprint collection apparatus located inside the effective target area to be in the operation state while keeping the second photosensitive elements located outside the effective target area to be in the non-operation state.

In some embodiments, in a batch processing of the fingerprint registrations, the electronic device has already invoked the fingerprint collection apparatus and keeps the fingerprint collection apparatus in the operation state. After the electronic device has invoked the fingerprint collection apparatus and the effective target area is determined, the electronic device controls the second photosensitive elements of the fingerprint collection apparatus located outside the effective target area to be in the non-operation state, and at the same time, keeps the first photosensitive elements located inside the effective target area to be in the operation state.

At 204, the first photosensitive elements in the operation state obtain fingerprint information of the touch input.

In some embodiments, the electronic device controls the first photosensitive elements of the fingerprint collection apparatus located inside the effective target area to be in the operation state and controls the second photosensitive elements located outside the effective target area to be in the non-operation state. Correspondingly, the first photosensitive elements in the operation state obtain the fingerprint information of the touch input, such as a fingerprint signal of the touch input.

At the same time, because the second photosensitive elements located outside the effective target area are in the non-operation state, the second photosensitive elements are unable to sense the ambient light and unable to obtain the light signal. Correspondingly, the second photosensitive elements do not leak the light signal into the first photosensitive elements. Compared with the method that all the photosensitive elements in the fingerprint collection area of the fingerprint collection apparatus directly obtain the fingerprint information in the existing technology, the information processing method effectively reduces the amount of the ambient light intake by the first photosensitive elements.

At 205, the fingerprint recognition process is performed on the fingerprint information.

In some embodiments, after the first photosensitive elements in the operation state obtain the fingerprint information of the touch input, the electronic device performs the fingerprint recognition process on the fingerprint information. Specifically, the first photosensitive elements in the operation state use a pre-set exposure time to perform an exposure processing on the collected fingerprint signal and then recognize the fingerprint image corresponding to the fingerprint signal of the touch input.

In some embodiments, by controlling the first photosensitive elements of the fingerprint collection apparatus located inside the effective target area to be in the operation state and controlling the second photosensitive elements located outside the effective target area to be in the non-operation state, the electronic device uses only the first photosensitive elements located inside the effective target area of the fingerprint collection area to obtain the fingerprint information. Because the second photosensitive elements located outside the effective target area are in the non-operation state, the second photosensitive elements are unable to sense the ambient light and unable to leak the light signal into the first photosensitive elements, such that the amount of the ambient light intake by the first photosensitive elements is reduced. Thus, the information processing method avoids the overexposure of the fingerprint image collected by the fingerprint collection apparatus to certain extent, and substantially ensures the quality of the collected fingerprint image.

Figure 4:
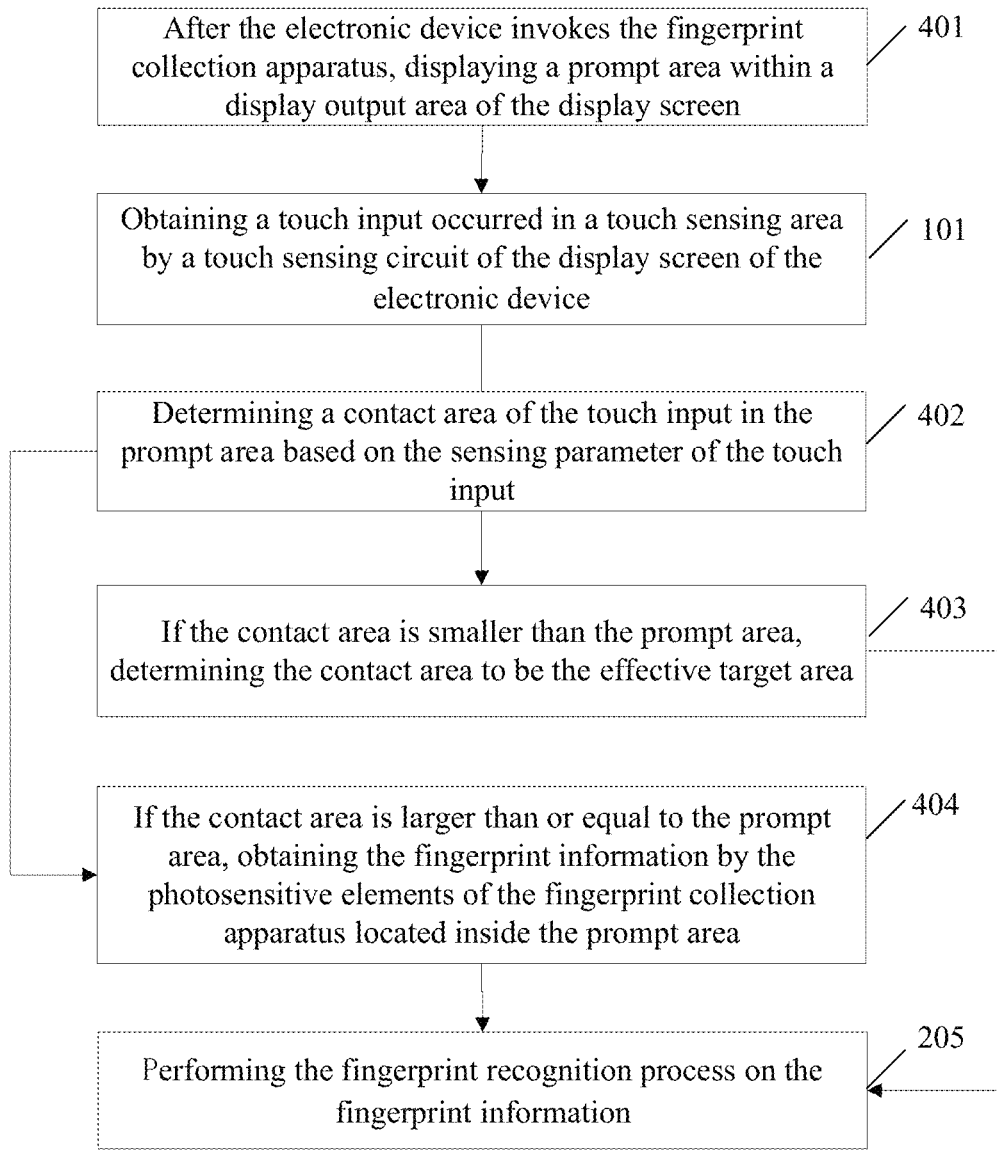
FIG. 4 illustrates a flowchart of another example of an information processing method according to some embodiments of the present disclosure.

FIG. 4 illustrates a flowchart of another example of an information processing method according to some embodiments of the present disclosure. As shown in FIG. 4, before the touch sensing circuit of the display screen obtains the touch input, the information processing method further includes the following processes.

At 401, after the electronic device invokes the fingerprint collection apparatus, the display screen displays a prompt area within a display output area of the display screen.

The prompt area is used to instruct a user to touch input in the prompt area, such that the fingerprint collection apparatus obtains the fingerprint information of the touch input.

Figure 5:
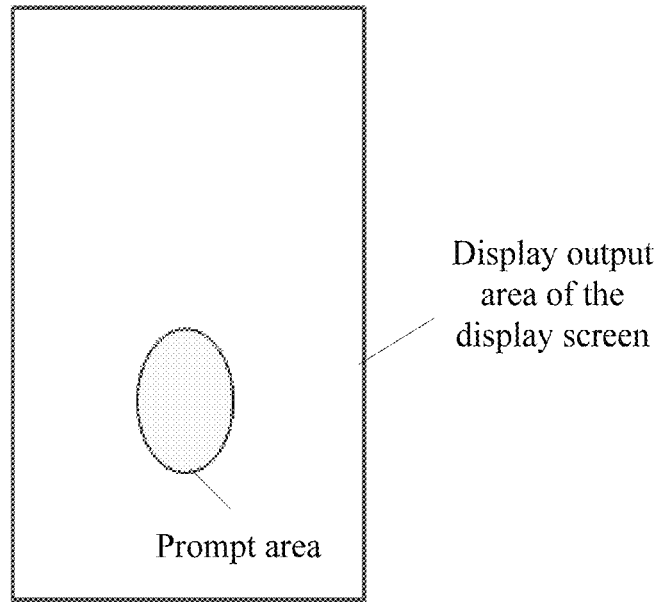
FIG. 5 illustrates a schematic diagram of a prompt area in a display output area of an electronic device display screen according to some embodiments of the present disclosure.

The prompt area is a portion of the display output area of the display screen. FIG. 5 illustrates a schematic diagram of the prompt area in the display output area of the electronic device display screen according to some embodiments of the present disclosure.

The prompt area is located inside the fingerprint collection area of the fingerprint collection apparatus. Specifically, the prompt area corresponds to at least a portion of the fingerprint collection area. After the display screen displays the prompt area, the photosensitive elements of the fingerprint collection apparatus located inside the prompt area are in the operation state while the photosensitive elements of the fingerprint collection apparatus located outside the prompt area are in the non-operation state. In response to the touch input by the user's finger inside the prompt area, the fingerprint collection apparatus senses the touch input inside the fingerprint collection area to obtain the fingerprint information of the touch input.

Further, as shown in FIG. 4, in the information processing method according to the present disclosure, determining the effective target area based on the sensing parameter of the touch input may be implemented in the following processes.

At 402, based on the sensing parameter of the touch input, a contact area of the touch input in the prompt area is determined.

At 403, if the contact area is smaller than the prompt area, the effective target area is determined to be the contact area located inside the prompt area.

If the contact area is smaller than the prompt area, it indicates that the overexposure occurs when all the photosensitive elements located inside the prompt area are in the operation state to obtain the fingerprint information (fingerprint image). In the embodiments of the present disclosure, the overexposure is avoided by controlling the photosensitive elements of the fingerprint collection apparatus located inside the prompt area but outside the effective target area to be in the non-operation state and controlling the photosensitive elements of the fingerprint collection apparatus located inside both the prompt area and the effective target area to be in the operation state to obtain the fingerprint information (fingerprint image).

At 404, if the contact area is larger than or equal to the prompt area, the fingerprint information is obtained by the photosensitive elements of the fingerprint collection apparatus located inside the prompt area.

After the electronic device invokes the fingerprint collection apparatus and the display screen displays the prompt area, the user enters the touch input of the user's fingerprint in the prompt area. Because the prompt area is located inside the fingerprint collection area of the fingerprint collection apparatus, based on how the user's finger contacts the prompt area, the electronic device determines the effective target area corresponding to the touch input within the fingerprint collection area of the fingerprint collection apparatus.

Specifically, based on the sensing parameter (e.g., the capacitive sensing parameter obtained based on the capacitive sensing technology or the resistive sensing parameter obtained based on the resistive sensing technology) obtained by sensing the touch input by the display screen, the electronic device determines the contact area of the touch input in the prompt area. If the contact area is smaller than the prompt area, the contact area is determined to be the effective target area. In some embodiments, the effective target area is a portion of the fingerprint collection area located inside the contact area. If the contact area is larger than or equal to the prompt area, the fingerprint information is obtained in a portion of the fingerprint collection area corresponding to the photosensitive elements of the fingerprint collection apparatus located inside the prompt area. Correspondingly, the photosensitive elements located inside the prompt area obtain the fingerprint information.

After the fingerprint information is obtained, the fingerprint recognition process is performed. The portion of the fingerprint collection area located outside the effective target area is ignored.

Figure 6:
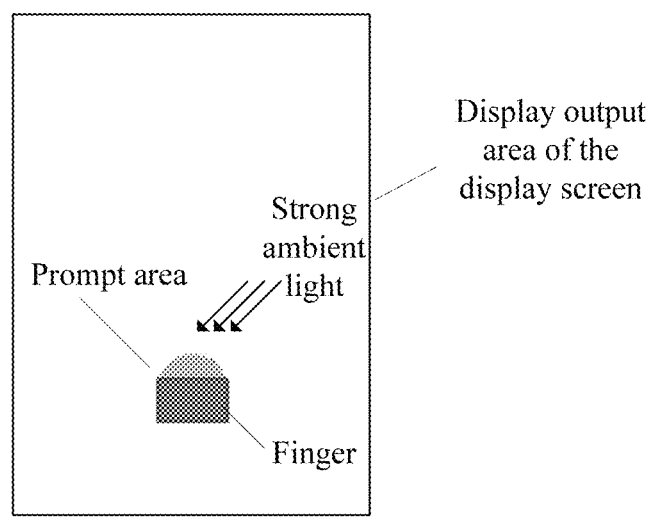
FIG. 6 illustrates a schematic diagram of ambient light entering a photosensitive element of a fingerprint collection apparatus through a portion of an entry area not contacted by a finger according to some embodiments of the present disclosure.

In the process of collecting the fingerprint information, the photosensitive elements of the fingerprint collection apparatus sense the fingerprint information under light provided by the electronic device, such as background light of the display screen of the electronic device. The electronic device provides a sufficient amount of exposure light for the normal exposure of the fingerprint signal. However, in practical applications, as shown in FIG. 6, when the user's finger inputs the fingerprint information through the touch input in the prompt area, it is possible that the finger only touches a portion of the prompt area instead of covering the entire prompt area. In this case, the ambient light enters into the touch sensing area of the photosensitive elements of the fingerprint collection apparatus such as CMOS sensing circuit through the portion of the prompt area that is not covered by the user's finger. As such, the photosensitive elements of the fingerprint collection apparatus take in excessive amount of the exposure light, thereby affecting the fingerprint collection in the prompt area.

If the contact area of the touch input occupies a substantial portion of the prompt area, that is, the non-contact portion of the prompt area is substantially small, the amount of the ambient light entering into the photosensitive elements of the fingerprint collection apparatus through the substantially small non-contact portion of the prompt area may be substantially small and may not substantially affect the normal exposure of the fingerprint signal. As such, sufficient amount of effective fingerprint information is collected. Conversely, if the contact area of the touch input does not occupy a substantial portion of the prompt area, that is, the non-contact portion of the prompt area is substantially large, the amount of the ambient light entering into the photosensitive elements of the fingerprint collection apparatus through the substantially large non-contact portion of the prompt area may be substantially large and may substantially affect the normal exposure of the fingerprint signal. As such, insufficient amount of effective fingerprint information is collected. In the case that the ambient light is substantially strong, the overexposure of the fingerprint image is likely to occur.

In some embodiments, if the contact area of the user's finger in the prompt area occupies less than ¾ of the prompt area, the strong ambient light is likely to cause the overexposure or near overexposure of the fingerprint image. If the contact area of the user's finger in the prompt area occupies more than ¾ of the prompt area, the overexposure or near overexposure of the fingerprint image is unlikely to occur.

FIGS. 7A-7F illustrate schematic diagrams of examples of overly-exposed fingerprint images according to some embodiments of the present disclosure. In the examples, the ambient light is strong and the non-contact portion of the prompt area is substantially large. As shown in FIGS. 7A-7F, the six fingerprint images are subject to the overexposure and insufficient amount of the effective fingerprint information is collected. As shown in FIG. 7E and FIG. 7F, the severe overexposure leaves the fingerprint images with almost completely white.

In some embodiments, after the contact area of the user's finger in the prompt area is determined to be smaller than the prompt area, the effective target area PValid is determined to be an area that satisfies the following condition: the contact portion of the fingerprint collection area≤PValid≤4/3 of the contact portion of the fingerprint collection area (at least including the contact portion of the fingerprint collection area).

In some embodiments, the effective target area is determined to be an effective operation area within the fingerprint collection area corresponding to the touch input (i.e., an area within the fingerprint collection area where the fingerprint information of the touch input is actually sensed by the photosensitive elements). In some other embodiments, the effective target area is determined to be an area that is larger than the effective operation area but smaller than 4/3 of the effective operation area (at least including the effective operation area). In either of the above two cases, the objective of ensuring that the overexposure of the fingerprint image does not occur in the fingerprint collection process can be achieved.

In the embodiments of the present disclosure, the fingerprint recognition process is performed in the effective target area of the touch input within the fingerprint collection area rather than the entire fingerprint collection area. As such, the ambient light signal is avoided to be sensed by the portion of the fingerprint collection area located outside the effective target area. Correspondingly, the suppressed ambient light signal is prevented from leaking into the effective target area and the amount of the ambient light taken by the effective target area is effectively reduced. Thus, the overexposure of the fingerprint image collected by the fingerprint collection apparatus is avoided to certain extent, thereby ensuring the quality of the collected fingerprint image.

FIG. 8 illustrates a flowchart of another example of an information processing method according to some embodiments of the present disclosure. As shown in FIG. 8, the information processing method further includes the following processes.

At 801, after the electronic device invokes the fingerprint collection apparatus, a fingerprint image of the touch input is obtained by the fingerprint collection apparatus.

At 802, if the fingerprint image satisfies an exposure condition, the effective target area is determined based on the sensing parameter of a subsequent touch input and the fingerprint information of the subsequent touch input is obtained in the effective target area.

In some embodiments, the overexposure condition is a condition indicating that the overexposure or near overexposure of the fingerprint image occurs. For example, the exposure of the fingerprint image reaches a pre-set exposure threshold. In another example, a ratio of ineffective information in the fingerprint image over effective information in the fingerprint image reaches a pre-set ratio threshold.

In some embodiments, after the electronic device invokes the fingerprint collection apparatus, the actual exposure of the fingerprint image collected by the fingerprint collection apparatus is evaluated to determine whether the ambient light affects the collection of the fingerprint information by the fingerprint collection apparatus. After it is determined that the ambient light affects the collection of the fingerprint information, the effective target area is determined.

In some embodiments, after the electronic device invokes the fingerprint collection apparatus, the fingerprint collection apparatus collects the touch input to obtain the fingerprint image. After the fingerprint collection apparatus obtains the fingerprint image, the electronic device determines whether the fingerprint image satisfies the overexposure condition. If the overexposure condition is satisfied, it indicates that the overexposure or near overexposure of the fingerprint image occurs. In this case, it is determined that the ambient light affects the fingerprint collection by the fingerprint collection apparatus. As such, the electronic device further determines the effective target area based on the sensing parameter of the subsequent touch input and obtains the fingerprint information of the subsequent touch input in the effective target area.

In some embodiments, determining the effective target area based on the sensing parameter of the subsequent touch input includes: determining the effective target area based on the contact area of the subsequent touch input on the display screen. For example, the effective target area is determined to be the contact area of the subsequent touch input in the prompt area of the display screen. For the description of determining the effective target area, reference can be made to the description of the previously described embodiments and details are omitted herein.

In some embodiments, after it is determined that the fingerprint image does not satisfy the overexposure condition, it indicates that the overexposure or near overexposure of the fingerprint image does not occur. In this case, it is determined that the ambient light does not affect the fingerprint collection by the fingerprint collection apparatus. As such, it is not necessary to determine the effective target area.

In some embodiments, determining whether the fingerprint image satisfies the overexposure condition includes, but is not limited to, determining whether the exposure of the fingerprint image reaches the pre-set exposure threshold or whether the ratio of the ineffective information in the fingerprint image over the effective information in the fingerprint image reaches the pre-set ratio threshold.

In the embodiments of the present disclosure, whether the ambient light affects the fingerprint collection by the fingerprint collection apparatus is determined based on the actual exposure of the fingerprint image collected by the fingerprint collection apparatus. After it is determined that the ambient light affects the fingerprint collection, the effective target area of the subsequent touch input is timely determined and the fingerprint recognition is performed in the determined effective target area. Thus, the overexposure of the subsequently collected fingerprint images caused by the ambient light is avoided.

Figure 9:
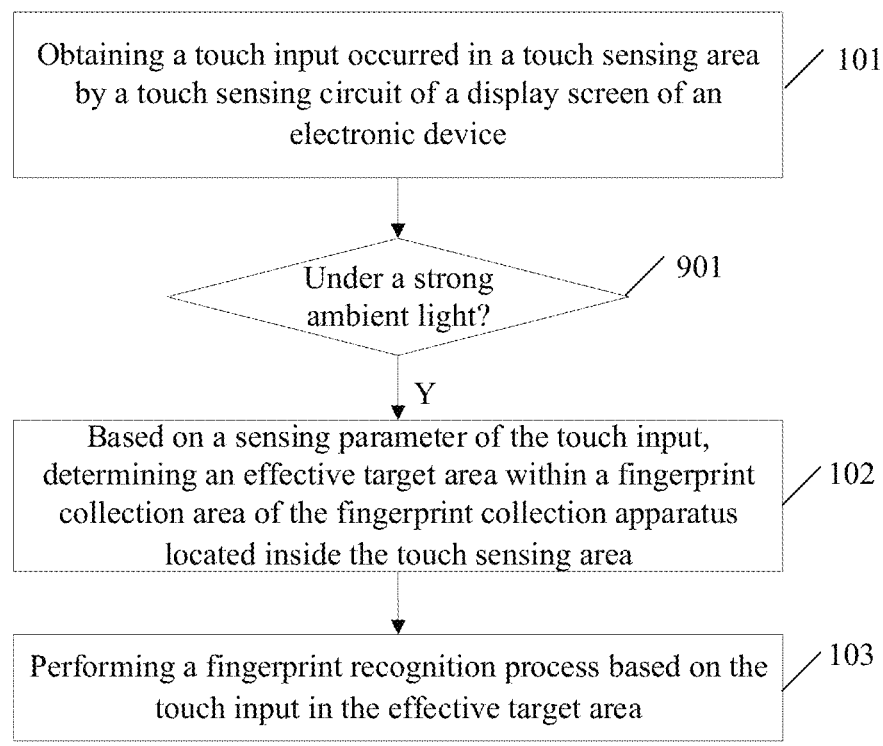
FIG. 9 illustrates a flowchart of another example of an information processing method according to some embodiments of the present disclosure.

FIG. 9 illustrates a flowchart of another example of an information processing method according to some embodiments of the present disclosure. As shown in FIG. 9, the information processing method further includes the following processes.

At 901, after the electronic device invokes the fingerprint collection apparatus, an ambient light sensor is used to determine a current strength of the ambient light. After it is determined that the current strength of the ambient light is strong, the effective target area is determined based on the sensing parameter of the touch input.

The strength of the ambient light is determined by an ambient light parameter, such as an illumination parameter of the ambient light. The illumination parameter includes, but is not limited to, an illumination intensity of the ambient light, that is lux. Correspondingly, the ambient light sensor may be, but is not limited to, an illumination sensor.

In practical applications, the fingerprint collection by the fingerprint collection apparatus under the strong ambient light is likely to suffer the overexposure while the fingerprint collection by the fingerprint collection apparatus under the weak ambient light is unlikely to suffer the overexposure. Without being affected by the ambient light, the fingerprint collection apparatus often obtains the normal quality fingerprint images based on the normal fingerprint collection practice. Thus, in this case, it is not necessary to determine the effective target area.

In some embodiments, whether the ambient light affects the fingerprint collection by the fingerprint collection apparatus is determined based on the strength of the ambient light to which the electronic device is exposed. After it is determined that the ambient light affects the fingerprint collection, the effective target area is determined and the fingerprint recognition is performed in the effective target area. After it is determined that the ambient light does not affect the fingerprint collection, it is not necessary to determine the effective target area.

In some embodiments, after the electronic device invokes the fingerprint collection apparatus, the electronic device first obtains the ambient light parameter, such as the illumination intensity of the ambient light. Based on the ambient light parameter, the electronic device determines whether the current strength of the ambient light is strong.

For example, an illumination threshold may be pre-configured. After the illumination intensity of the ambient light is sensed to reach or be above the illumination threshold, the electronic device determines that the current strength of the ambient light is strong. After the illumination intensity of the ambient light is sensed to be below the illumination threshold, the electronic device determines that the current strength of the ambient light is weak.

After the electronic device determines that the current strength of the ambient light is strong, the electronic device determines that the ambient light affects the fingerprint collection by the fingerprint collection apparatus. Conversely, after the electronic device determines that the current strength of the ambient light is weak, the electronic device determines that the ambient light does not affect the fingerprint collection by the fingerprint collection apparatus.

Then, after the electronic device determines that the ambient light affects the fingerprint collection by the fingerprint collection apparatus, the electronic device further determines the effective target area based on the sensing parameter of the touch input, and performs the fingerprint recognition in the determined effective target area. Conversely, after the electronic device determines that the ambient light does not affect the fingerprint collection by the fingerprint collection apparatus, it is not necessary for the electronic device to further determine the effective target area. Instead, the electronic device directly uses the entire fingerprint collection area of the fingerprint collection apparatus to perform the fingerprint recognition on the touch input by the user's finger.

In some embodiments, determining the effective target area based on the sensing parameter of the touch input area includes: determining the effective target area based on the contact area of the touch input on the display screen. For example, the effective target area is determined to be the contact area of the subsequent touch input in the prompt area of the display screen. For the description of determining the effective target area, reference can be made to the description of the previously described embodiments and details are omitted herein.

In the embodiments of the present disclosure, the electronic device first determines whether the ambient light affects the fingerprint collection by the fingerprint collection apparatus based on the current strength of the ambient light. After it is determined that the ambient light affects the fingerprint collection, the effective target area is further determined and the fingerprint recognition is performed in the determined effective target area. Conversely, after it is determined that the ambient light does not affect the fingerprint collection, the electronic device directly uses the entire fingerprint collection area of the fingerprint collection apparatus to perform the fingerprint recognition on the touch input of the user's finger. Thus, the information processing method effectively reduces processing workload of the electronic device under the circumstance that the ambient light does not affect the fingerprint collection.

The present disclosure also provides an electronic device. The electronic device may be, but is not limited to, a portable terminal device with a display screen and a fingerprint collection apparatus, such as a smart wearable device, a smart phone, a tablet computer, a personal digital assistant, or a personal computer, such as a notebook computer, an all-in-one computer, a desktop computer.

Figure 10:
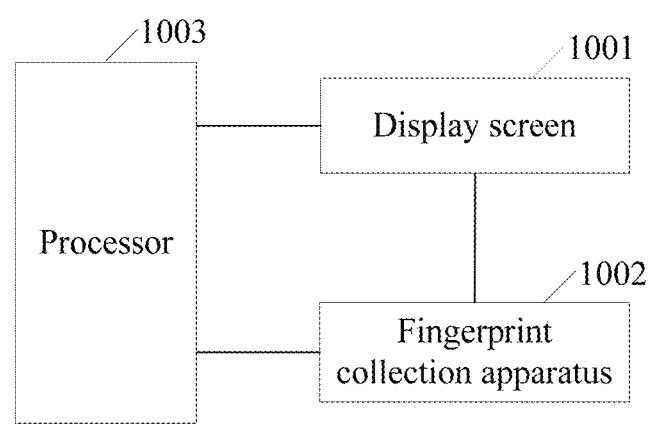
FIG. 10 illustrates a structural diagram of an example of an electronic device according to some embodiments of the present disclosure.

FIG. 10 illustrates a structural diagram of an example of an electronic device according to some embodiments of the present disclosure. A shown in FIG. 10, the electronic device includes: a display screen 1001, a fingerprint collection apparatus 1002, and a processor 1003.

The display screen 1001 includes a touch sensing area and a display output area. The display output area of the display screen 1001 and the touch sensing area of the display screen 1001 may be consistent with each other (e.g., substantially the same and may be referred interchangeably). The fingerprint collection apparatus 1002 is disposed under the display screen 1001. The fingerprint collection apparatus includes a fingerprint collection area. The fingerprint collection area is located inside the display output area and the touch sensing area. The fingerprint collection area is smaller than or equal to the display output area. The processor 1003 is configured to obtain the touch input through the touch sensing circuit of the display screen 1001. The touch sensing circuit includes the touch sensing area. The touch input is inside the touch sensing area. The processor 1003 is further configured to perform the fingerprint recognition in the effective target area.

In some embodiments, the electronic device includes the display screen and the fingerprint collection apparatus. The display screen includes the display output area and the touch sensing area of the touch sensing circuit. The display output area of the display screen and the touch sensing area of the display screen are consistent with each. The display screen may be, but is not limited to, the capacitive touch screen or the resistive touch screen. Correspondingly, the touch sensing circuit may be, but is not limited to, the capacitive touch sensing circuit or the resistive touch sensing circuit. The fingerprint collection apparatus may be a device capable of collection the fingerprint information of a finger, such as a fingerprint sensor. In some embodiments, the fingerprint collection apparatus may be disposed at the bottom of the display screen. That is, the fingerprint collection apparatus is an in-display fingerprint collection apparatus.

The fingerprint collection apparatus includes the fingerprint collection area and a plurality of photosensitive elements. The fingerprint collection area is located inside the display output area and the touch sensing area. The fingerprint collection area is smaller than or equal to the display output area and the touch sensing area. For example, the fingerprint collection area may be a half-screen in-display fingerprint collection area or a full-screen in-display fingerprint collection area.

The plurality of photosensitive elements may be, but are not limited to, devices such as complementary metal oxide semiconductor (CMOS) and charge coupled device (CCD), capable of sensing light to form an image. A photosensitive area of the plurality of photosensitive elements in the touch sensing area forms the fingerprint collection area of the fingerprint collection apparatus.

In some embodiments, the touch input is obtained through the touch sensing circuit of the display screen. Specifically, the touch sensing circuit of the display screen obtains the touch input by a user's finger in the touch sensing area of the electronic device. For example, based on an actual fingerprint collection demand (such as fingerprint match for identity verification or fingerprint collection need for fingerprint information registration), the electronic device needs to collect user's fingerprint information. The user performs the touch input of the fingerprint in the touch sensing area of the electronic device. In this process, the touch sensing circuit of the display screen obtains the touch input of the fingerprint in the touch sensing area.

In some embodiments, the sensing parameter of the touch input is a sensing parameter obtained in the process that the display screen of the electronic device performs touch sensing of the touch input, corresponding to various types of electronic device display screens. The sensing parameter may be, but is not limited to, a capacitive touch sensing parameter obtained based on the capacitive touch technology or a resistive touch sensing parameter obtained based on the resistive touch technology.

The effective target area is determined based on the sensing parameter of the touch input. In some embodiments, based on the sensing parameter of the touch input, an effective operation area corresponding to the touch input is determined within the fingerprint collection area of the fingerprint collection apparatus. The effective operation area is an area within the fingerprint collection area of the fingerprint collection apparatus that actually performs a photosensitive sensing of the fingerprint information of the touch input.

In some embodiments, the effective target area is smaller than or equal to the fingerprint collection area of the fingerprint collection apparatus.

Based on the actual fingerprint collection demand (such as the fingerprint match for the identity verification or the fingerprint collection need for the fingerprint information registration), the electronic device invokes the fingerprint collection apparatus to collect the user's fingerprint information. The fingerprint collection apparatus uses the photosensitive elements in the fingerprint collection area to perform the photosensitive sensing on the user's touch input to collect the fingerprint image. To avoid the overexposure or near overexposure of the fingerprint image collected by the fingerprint collection apparatus, after the touch sensing circuit of the display screen obtains the touch input of the user's finger, the electronic device does not directly perform the fingerprint recognition on the touch input in the fingerprint collection area of the fingerprint collection apparatus. Instead, based on the sensing parameter of the touch input, the electronic device determines the effective target area corresponding to the touch input within the fingerprint collection area of the fingerprint collection apparatus. In this way, only the effective target area within the fingerprint collection area rather than the entire collection area is used to perform the fingerprint recognition.

Compared with using the entire collection area of the fingerprint collection apparatus to perform the fingerprint recognition in the existing technology, only the effective target area corresponding to the touch input within the fingerprint collection area rather than the entire collection area is used to perform the fingerprint recognition, thereby preventing the portion of the fingerprint collection area outside the effective target area from sensing ambient light signal. Correspondingly, the portion of the light signal is prevented from leaking into the effective target area, and the amount of ambient light intake in the effective target area is effectively reduced.

In the information processing method provided in the embodiments of the present disclosure, because the fingerprint recognition is performed in the effective target area rather than the entire area within the fingerprint collection area, sensing the ambient light by the portion of the fingerprint collection area outside the effective target area is effectively prevented. Correspondingly, the portion of the light signal is prevented from leaking into the effective target area, and the amount of the ambient light intake in the effective target area is effectively reduced. Thus, the information processing method avoids the overexposure of the fingerprint image collected by the fingerprint collection apparatus to certain extent, and substantially ensures the quality of the fingerprint image collected by the fingerprint sensor.

In some embodiments, the fingerprint recognition in the effective target area performed by the processor 1003 of the electronic device further includes the following processes. The plurality of the photosensitive elements includes first photosensitive elements located inside the effective target area and second photosensitive elements located outside the effective target area. The processor 1003 is further configured to control the first photosensitive elements to be in the operation state and the second photosensitive elements to be in the non-operation state. The first photosensitive elements in the operation state obtain the fingerprint information of the touch input. The processor 1003 is further configured to perform the fingerprint recognition on the fingerprint information.

For example, the fingerprint collection apparatus includes the plurality of photosensitive elements, CMOS or CCD photosensitive elements. The photosensitive area of the plurality of photosensitive elements in the touch sensing area forms the fingerprint collection area of the fingerprint collection apparatus.

In some embodiments, the effective target area in the fingerprint collection area of the fingerprint collection apparatus is determined based on the sensing parameter of the touch input. For example, the effective operation area of the touch input in the fingerprint collection area of the fingerprint collection apparatus is determined. Referring to FIG. 3, the processor 1003 is further configured to control the first photosensitive elements located inside the effective target area to be in the operation state and the second photosensitive elements located outside the effective target area to be in the non-operation state.

In some embodiments, after the effective target area is determined and before the fingerprint collection apparatus is invoked (e.g., in the process of collection the fingerprint, the display screen displays a fingerprint collection interface, and the electronic device does not invoke the fingerprint collection apparatus until the effective target area is determined), the electronic device may now invoke the fingerprint collection apparatus. When invoking the fingerprint collection apparatus, the processor 1003 is further configured to activate the first photosensitive elements located inside the effective target area to be in the operation state and not activate the second photosensitive elements located outside the effective target area to be in the non-operation state.

In some embodiments, the fingerprint collection apparatus has already been invoked (e.g., in the batch processing of the fingerprint registrations, fingerprint collection apparatus remains activated). After the effective target area is determined, the processor 1003 is further configured to deactivate the second photosensitive element located outside the effective target area to be in the non-operation state while keeping the first photosensitive elements located inside the effective target area in the operation state.

In some embodiments, the first photosensitive elements located inside the effective target area is controlled to be in the operation state and the second photosensitive elements located outside the effective target area is controlled to be in the non-operation state. Correspondingly, the first photosensitive elements in the operation state obtain the fingerprint information of the touch input, such as the fingerprint signal of the touch input.

At the same time, because the second photosensitive elements located outside the effective target area are in the non-operation state, the second photosensitive elements are unable to sense the ambient light and unable to obtain the light signal. Correspondingly, the second photosensitive elements do not leak the light signal to the first photosensitive elements. Compared with the method that all the photosensitive elements in the fingerprint collection area of the fingerprint collection apparatus directly obtain the fingerprint information in the existing technology, the information processing method effectively reduces the amount of the ambient light intake by the first photosensitive elements.

In some embodiments, after the first photosensitive elements in the operation state obtain the fingerprint information of the touch input, the processor 1003 is further configured to perform the fingerprint recognition process on the fingerprint information. Specifically, the first photosensitive elements in the operation state use the pre-set exposure time to perform the exposure processing on the collected fingerprint signal and then recognize the fingerprint image corresponding to the fingerprint signal of the touch input.

In some embodiments, by controlling the first photosensitive elements corresponding to the plurality of photosensitive elements of the fingerprint collection apparatus inside the effective target area to be in the operation state and controlling the second photosensitive elements located outside the effective target area to be in the non-operation state, the processor 1003 is further configured to use only the first photosensitive elements located inside the effective target area of the fingerprint collection area to collect the fingerprint information. Because the second photosensitive elements located outside the effective target area are in the non-operation state, the second photosensitive elements are unable to sense the ambient light and unable to leak the light signal to the first photosensitive elements, such that the amount of the ambient light intake by the first photosensitive elements is reduced. Thus, the information processing method avoids the overexposure of the fingerprint image collected by the fingerprint collection apparatus to certain extent, and substantially ensures the quality of the collected fingerprint image.

In some embodiments, before the touch sensing circuit of the display screen obtains the touch input, the processor 1003 of the electronic device is further configured to display a prompt area on the display screen when the electronic device invokes the fingerprint collection apparatus.

The prompt area is used to instruct a user to touch input in the prompt area, such that the fingerprint collection apparatus obtains the fingerprint information of the touch input.

The prompt area is a portion of the display output area of the display screen. FIG. 5 illustrates a schematic diagram of the prompt area in the display output area of the electronic device display screen according to some embodiments of the present disclosure.

The prompt area corresponds to the fingerprint collection area of the fingerprint collection apparatus. Specifically, the prompt area corresponds to at least a portion of the fingerprint collection area. In response to the touch input by the user inside the prompt area, the fingerprint collection apparatus senses the touch input inside the fingerprint collection area to collect the fingerprint information of the touch input.

In some embodiments, determining the effective target area by the processor 1003 of the electronic device based on the sensing parameter of the touch input may be implemented in the following processes. Based on the sensing parameter of the touch input, a contact area of the touch input in the prompt area is determined. If the contact area is smaller than the prompt area, the effective target area is determined to be the contact area located inside the prompt area. If the contact area is larger than or equal to the prompt area, the effective target area is determined to be the fingerprint collection area corresponding to the photosensitive elements of the fingerprint collection apparatus located inside both the prompt area and the contact area, such that the photosensitive elements located inside the prompt area subsequently collect the fingerprint information.

After the electronic device invokes the fingerprint collection apparatus and the display screen displays the prompt area, the user enters the touch input of the user's fingerprint in the prompt area. Because the prompt area is located inside the fingerprint collection area of the fingerprint collection apparatus, based on how the user's finger contacts the prompt area, the processor 1003 of the electronic device is further configured to determine the effective target area corresponding to the touch input within the fingerprint collection area of the fingerprint collection apparatus.

Specifically, based on the sensing parameter (e.g., the capacitive sensing parameter obtained based on the capacitive sensing technology or the resistive sensing parameter obtained based on the resistive sensing technology) obtained by sensing the touch input by the display screen, the processor 1003 of the electronic device is further configured to determine the contact area of the touch input in the prompt area. If the contact area is smaller than the prompt area, the contact area is determined to be the effective target area. In some embodiments, the effective target area is a portion of the fingerprint collection area located inside the contact area. If the contact area is larger than or equal to the prompt area, a portion of the fingerprint collection area corresponding to the photosensitive elements of the fingerprint collection apparatus located inside the prompt area is determined to be the effective target area. Correspondingly, the photosensitive elements located inside the prompt area collect the fingerprint information.

After the effective target area in the fingerprint collection area of the fingerprint collection apparatus is determined, the fingerprint recognition process is performed. The portion of the fingerprint collection area outside the effective target area is ignored.

In the process of collecting the fingerprint information, the photosensitive elements of the fingerprint collection apparatus sense the fingerprint information under light provided by the electronic device, such as background light of the display screen of the electronic device. The electronic device provides a sufficient amount of exposure light for the normal exposure of the fingerprint signal. However, in practical applications, as shown in FIG. 6, when the user's finger inputs the fingerprint information through the touch input in the prompt area, it is possible that the finger only touches a portion of the prompt area instead of covering the entire prompt area. In this case, the ambient light enters into the touch sensing area of the photosensitive elements of the fingerprint collection apparatus such as CMOS sensing circuit through the portion of the prompt area that is not covered by the user's finger. As such, the photosensitive elements of the fingerprint collection apparatus take in excessive amount of the exposure light, thereby affecting the fingerprint collection in the prompt area.

If the contact area of the touch input occupies a substantial portion of the prompt area, that is, the non-contact portion of the prompt area is substantially small, the amount of the ambient light entering into the photosensitive elements of the fingerprint collection apparatus through the substantially small non-contact portion of the prompt area may be substantially small and may not substantially affect the normal exposure of the fingerprint signal. As such, sufficient amount of effective fingerprint information is collected. Conversely, if the contact area of the touch input does not occupy a substantial portion of the prompt area, that is, the non-contact portion of the prompt area is substantially large, the amount of the ambient light entering into the photosensitive elements of the fingerprint collection apparatus through the substantially large non-contact portion of the prompt area may be substantially large and may substantially affect the normal exposure of the fingerprint signal. As such, insufficient amount of effective fingerprint information is collected. In the case that the ambient light is substantially strong, the overexposure of the fingerprint image is likely to occur.

In some embodiments, if the contact area of the user's finger in the prompt area occupies less than 3/4 of the prompt area, the strong ambient light is likely to cause the overexposure or near overexposure of the fingerprint image. If the contact area of the user's finger in the prompt area occupies more than 3/4 of the prompt area, the overexposure or near overexposure of the fingerprint image is unlikely to occur.

FIGS. 7A-7F illustrates schematic diagrams of examples of overly-exposed fingerprint images according to some embodiments of the present disclosure. In the examples, the ambient light is strong and the non-contact portion of the prompt area is substantially large. As shown in FIGS. 7A-7F, the six fingerprint images are subject to the overexposure and insufficient amount of the effective fingerprint information is collected. As shown in FIG. 7E and FIG. 7F, the severe overexposure leaves the fingerprint images with almost completely white.

In some embodiments, after the contact area of the user's finger in the prompt area is detected to be smaller than the prompt area, the effective target area PValid is determined to be an area that satisfies the following condition: the contact portion of the fingerprint collection area≤PValid≤4/3 of the contact portion of the fingerprint collection area (at least including the contact portion of the fingerprint collection area).

In some embodiments, the effective target area is determined to be an effective operation area within the fingerprint collection area corresponding to the touch input (i.e., an area within the fingerprint collection area where the fingerprint information of the touch input is actually sensed by the photosensitive elements). In some other embodiments, the effective target area is determined to be an area that is larger than the effective operation area but smaller than 4/3 of the effective operation area (at least including the effective operation area). In either of the above two cases, the objective of ensuring that the overexposure of the fingerprint image does not occur in the fingerprint collection process can be achieved.

In the embodiments of the present disclosure, the fingerprint recognition process is performed in the effective target area of the touch input within the fingerprint collection area rather than the entire fingerprint collection area. As such, the ambient light signal is avoided to be sensed by the portion of the fingerprint collection area outside the effective target area. Correspondingly, the suppressed ambient light signal is prevented from leaking into the effective target area and the amount of the ambient light taken by the effective target area is effectively reduced. Thus, the overexposure of the fingerprint image collected by the fingerprint collection apparatus is avoided to certain extent, thereby ensuring the quality of the collected fingerprint image.

In some embodiments, the processor 1003 of the electronic device is further configured to obtain the fingerprint image of the touch input from the fingerprint collection apparatus if the fingerprint collection apparatus is invoked, determine the effective target area based on the sensing parameter of the subsequent touch input if the fingerprint image satisfies the overexposure condition, and perform the fingerprint recognition in the effective target area on the fingerprint information of the subsequent touch input.

In some embodiments, the overexposure condition is a condition indicating that the overexposure or near overexposure of the fingerprint image occurs. For example, the exposure of the fingerprint image reaches a pre-set exposure threshold. In another example, a ratio of ineffective information in the fingerprint image over the effective information in the fingerprint image reaches a pre-set ratio threshold.

In some embodiments, after the electronic device invokes the fingerprint collection apparatus, the actual exposure of the fingerprint image collected by the fingerprint collection apparatus is evaluated to determine whether the ambient light affects the collection of the fingerprint information by the fingerprint collection apparatus. After it is determined that the ambient light affects the collection of the fingerprint information, the effective target area is determined.

In some embodiments, after the electronic device invokes the fingerprint collection apparatus, the fingerprint collection apparatus collects the touch input to obtain the fingerprint image. After the fingerprint collection apparatus obtains the fingerprint image, the processor 1003 of the electronic device is further configured to determine whether the fingerprint image satisfies the overexposure condition. If the overexposure condition is satisfied, it indicates that the overexposure or near overexposure of the fingerprint image occurs. In this case, it is determined that the ambient light affects the fingerprint collection by the fingerprint collection apparatus. As such, the processor 1003 of the electronic device is further configured to determine the effective target area based on the sensing parameter of the subsequent touch input and perform the fingerprint recognition in the effective target area on the fingerprint information of the subsequent touch input.

In some embodiments, determining the effective target area based on the sensing parameter of the subsequent touch input includes: determining the effective target area based on the contact area of the subsequent touch input on the display screen. For example, the effective target area is determined to be the contact area of the subsequent touch input in the prompt area of the display screen. For the description of determining the effective target area, reference can be made to the description of the previously described embodiments and details are omitted herein.

In some embodiments, after it is determined that the fingerprint image does not satisfy the overexposure condition, it indicates that the overexposure or near overexposure of the fingerprint image does not occur. In this case, it is determined that the ambient light does not affect the fingerprint collection by the fingerprint collection apparatus. As such, it is not necessary to determine the effective target area.

In some embodiments, determining whether the fingerprint image satisfies the overexposure condition includes, but is not limited to, determining whether the exposure of the fingerprint image reaches the pre-set exposure threshold or whether the ratio of ineffective information in the fingerprint image over the effective information in the fingerprint image reaches the pre-set ratio threshold.

In the embodiments of the present disclosure, whether the ambient light affects the fingerprint collection by the fingerprint collection apparatus is determined based on the actual exposure of the fingerprint image collected by the fingerprint collection apparatus. After it is determined that the ambient light affects the fingerprint collection, the effective target area of the subsequent touch input is timely determined and the fingerprint recognition is performed in the determined effective target area. Thus, the overexposure of the subsequently collected fingerprint images caused by the ambient light is avoided.

In some embodiments, the processor 1003 of the electronic device is further configured to determine the current strength of the ambient light by using the ambient light sensor after the electronic device invokes the fingerprint collection apparatus, and determine the effective target area based on the sensing parameter of the touch input after it is determined that the current strength of the ambient light is strong.

The strength of the ambient light is determined by an ambient light parameter, such as an illumination parameter of the ambient light. The illumination parameter includes, but is not limited to, an illumination intensity of the ambient light, that is lux. Correspondingly, the ambient light sensor may be, but is not limited to, an illumination sensor.

In practical applications, the fingerprint collection by the fingerprint collection apparatus under the strong ambient light is likely to suffer the overexposure while the fingerprint collection by the fingerprint collection apparatus under the weak ambient light is unlikely to suffer the overexposure. Without being affected by the ambient light, the fingerprint collection apparatus often obtains the normal quality fingerprint images based on the normal fingerprint collection practice. Thus, in this case, it is not necessary to determine the effective target area.

In some embodiments, after the electronic device invokes the fingerprint collection apparatus, the processor 1003 of the electronic device is further configured to first determine whether the ambient light affects the fingerprint collection by the fingerprint collection apparatus based on the current strength of the ambient light. After it is determined that the ambient light affects the fingerprint collection, the processor 1003 of the electronic device is further configured to determine the effective target area and perform the fingerprint recognition in the effective target area. Conversely, after it is determined that the ambient light does not affect the fingerprint collection, it is not necessary for the processor 1003 of the electronic device to determine the effective target area.

In some embodiments, after the electronic device invokes the fingerprint collection apparatus, the processor 1003 of the electronic device is further configured to first obtain the ambient light parameter such as the illumination intensity of the ambient light and determine whether the electronic device is operating under the strong ambient light based on the ambient light parameter such as the illumination intensity of the ambient light.

For example, the illumination threshold may be pre-configured. After the illumination intensity of the ambient light is sensed to reach or be above the illumination threshold, the processor 1003 of the electronic device is further configured to determine that the electronic device is operating under the strong ambient light. After the illumination intensity of the ambient light is sensed to be below the illumination threshold, the processor 1003 of the electronic device is further configured to determine that the electronic device is operating under the weak ambient light.

After the processor 1003 of the electronic device determines that the electronic device is operating under the strong ambient light, the processor 1003 of the electronic device is further configured to determine that the ambient light affects the fingerprint collection by the fingerprint collection apparatus. Conversely, after the processor 1003 of the electronic device determines that the electronic device is operating under the weak ambient light, the processor 1003 of the electronic device is further configured to determine that the ambient light does not affect the fingerprint collection by the fingerprint collection apparatus.

Then, after the processor 1003 of the electronic device determines that the ambient light affects the fingerprint collection by the fingerprint collection apparatus, the processor 1003 of the electronic device is further configured to determine the effective target area based on the sensing parameter of the touch input and perform the fingerprint recognition in the determined effective target area. Conversely, after the processor 1003 of the electronic device determines that the ambient light does not affect the fingerprint collection by the fingerprint collection apparatus, it is not necessary for the processor 1003 of the electronic device to further determine the effective target area. Instead, the processor 1003 of the electronic device is further configured to directly use the entire fingerprint collection area of the fingerprint collection apparatus to perform the fingerprint recognition on the touch input by the user's finger.

In some embodiments, determining the effective target area based on the sensing parameter of the touch input includes: determining the effective target area based on the contact area of the touch input on the display screen. For example, the effective target area is determined to be the contact area of the subsequent touch input in the prompt area of the display screen. For the description of determining the effective target area, reference can be made to the description of the previously described embodiments and details are omitted herein.

In the embodiments of the present disclosure, the processor of the electronic device is configured to first determine whether the ambient light affects the fingerprint collection by the fingerprint collection apparatus based on the current strength of the ambient light. After it is determined that the ambient light affects the fingerprint collection, the effective target area is further determined and the fingerprint recognition is performed in the determined effective target area. Conversely, after it is determined that the ambient light does not affect the fingerprint collection, the processor of the electronic device is further configured to directly use the entire fingerprint collection area of the fingerprint collection apparatus to perform the fingerprint recognition on the touch input of the user's finger. Thus, the information processing method effectively reduces processing workload of the electronic device under the circumstance that the ambient light does not affect the fingerprint collection.

It should be noted that various embodiments are described in the specification in a progressive manner. Each embodiment focuses on the differences from other embodiments. The same and similar parts between various embodiments are referred to each other.

For the convenience of description, the device and the apparatus are described by function modules or circuits, respectively. In the embodiments of the present disclosure, the functions of the modules and circuits may be implemented by a same or multiple software and/or hardware.

From the description of the embodiments of the present disclosure, those skilled in the art may clearly understand the present disclosure can be implemented by software running on general-purpose hardware platform. As such, the technical solution of the present disclosure or the portion of the contribution on top of the existing technology can be embodied in the form of a software product or a computer software product. The computer software product may be stored in a storage medium, such as a read-only memory (ROM), a random-access memory (RAM), a magnetic disk, or an optical disk. The computer software includes a plurality of instructions causing a computer device (e.g., a person computer, a server, or a networking device) to execute some or all of the information processing method as described in various embodiments.

Further, it should be noted that in the specification, relational terms such as first, second, third, and fourth are only used to distinguish one entity or operation from another entity or operation. No actual relationship or order of the entities or operations is required or implied. Moreover, terms such as: including", "comprising", or any other variation thereof are intended to encompass non-exclusive inclusion, such that a process, a method, an article, or a device that includes a series of elements includes not only these elements but also those not explicitly listed or other elements inherent to the process, the method, the article, or the device. Without further restrictions, the elements defined by the sentence "including a . . . " do not exclude the existence of other identical elements in the process, the method, the article, or the device.

In the specification of the present disclosure, descriptions with reference to the terms "one embodiment", "some embodiments", "examples", "specific examples", or "some examples", etc. mean that specific features, structures, materials, or characteristics described in the embodiments or examples are included in at least one embodiment or example of the present disclosure. In the specification, the above terms are not intended to refer to a same embodiment or example. Moreover, the described specific features, structures, material, or characteristics may be combined in any suitable manner in one or more embodiments or examples.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Therefore, a true scope and spirit of the invention is indicated by the following claims.

What is claimed is:

1. An information processing method comprising:
   obtaining a touch input occurred in a touch sensing area by a touch sensing circuit of a display screen of an electronic device;
   determining, with aid of an ambient light senor, whether the electronic device is operating under a strong ambient light;
   in response to determining that the electronic device is operating under the strong ambient light:
      based on a sensing parameter of the touch input, determining an effective target area within a fingerprint collection area of an in-display fingerprint collection apparatus, the fingerprint collection area being smaller than or equal to the touch sensing area; and
      performing a fingerprint recognition process based on the touch input within the effective target area; and
   controlling, in response to determining that the electronic device is not operating under the strong ambient light, to perform the fingerprint recognition process without determining the effective target area.

2. The method according to claim 1, wherein performing the fingerprint recognition process in the effective target area includes:
   controlling first photosensitive elements of the fingerprint collection apparatus located inside the effective target area to be in an operation state, and second photosensitive elements of the fingerprint collection apparatus located outside the effective target area to be in a non-operation state;
   obtaining, by the first photosensitive elements in the operation state, fingerprint information of the touch input; and
   performing the fingerprint recognition process on the fingerprint information.

3. The method according to claim 2, further comprising:
   after the electronic device invokes the fingerprint collection apparatus, obtaining a fingerprint image of the touch input; and
   in response to determining that the fingerprint image satisfies an overexposure condition, determining the effective target area based on the sensing parameter of a subsequent touch input.

4. The method according to claim 3, wherein determining the effective target area based on the sensing parameter of the touch control input includes:
   determining the effective target area based on a contact area of the subsequent touch input on the display screen.

5. The method according to claim 3, wherein determining the effective target area based on the sensing parameter of the touch control input includes:

determining the effective target area based on a contact area of the subsequent touch input on the display screen.

6. The method according to claim 2, further comprising:
after the electronic device invokes the fingerprint collection apparatus, obtaining a fingerprint image of the touch input; and
in response to determining that the fingerprint image satisfies an overexposure condition, determining the effective target area based on the sensing parameter of a subsequent touch input.

7. The method according to claim 1, further comprising:
after the electronic device invokes the fingerprint collection apparatus, displaying a prompt area on the display screen for instructing a user to provide the touch input to the fingerprint collection apparatus.

8. The method according to claim 7, wherein determining the effective target area based on the sensing parameter of the touch input includes:
determining a contact area of the touch input in the prompt area based on the sensing parameter of the touch input; and
in response to determining that the contact area is smaller than the prompt area, determining the contact area to be the effective target area.

9. The method according to claim 8, further comprising:
in response to determining that the contact area is larger than or equal to the prompt area, obtaining fingerprint information by photosensitive elements of the fingerprint collection apparatus located inside the prompt area.

10. The method according to claim 7, wherein determining the effective target area based on the sensing parameter of the touch input includes:
determining a contact area of the touch input in the prompt area based on the sensing parameter of the touch input; and
in response to determining that the contact area is smaller than the prompt area, determining the contact area to be the effective target area.

11. The method according to claim 8, further comprising:
in response to determining that the contact area is larger than or equal to the prompt area, obtaining fingerprint information by photosensitive elements of the fingerprint collection apparatus located inside the prompt area.

12. The method according to claim 1, wherein determining whether the electronic device is operating under the strong ambient light includes:
obtaining ambient light parameter using the ambient light sensor, the ambient light parameter including illumination intensity; and
determining, in response to the illumination intensity being equal to or above an illumination threshold, that the electronic device is operating under the strong ambient light.

13. The method according to claim 1, further comprising:
invoking, after the effective target area is determined and before performing the fingerprint recognition process, the fingerprint collection apparatus.

14. The method according to claim 1, wherein determining the effective target area includes:
determining an effective operation area within the fingerprint collection area, the effective operation area being an area within the fingerprint collection area where the touch input is sensed by photosensitive elements of the fingerprint collection apparatus; and
determining the effective target area based on the effective operation area.

15. The method according to claim 14, wherein:
the effective target area is larger than the effective operation area but smaller than 4/3 of the effective operation area.

16. An electronic device comprising:
a display screen having a touch sensing area;
a fingerprint collection apparatus disposed under the display screen and including a fingerprint collection area, wherein the fingerprint collection area is smaller than or equal to the touch sensing area; and
a processor configured to perform:
obtaining a touch input occurred in the touch sensing area from a touch sensing circuit of the display screen;
determining, with aid of an ambient light senor, whether the electronic device is operating under a strong ambient light;
in response to determining that the electronic device is operating under the strong ambient light:
based on a sensing parameter of the touch input, determining an effective target area within the fingerprint collection area; and
performing a fingerprint recognition process based on the touch input within the effective target area; and
controlling, in response to determining that the electronic device is not operating under the strong ambient light, to perform the fingerprint recognition process without determining the effective target area.

17. The electronic device according to claim 16, wherein performing the fingerprint recognition process in the effective target area includes:
controlling first photosensitive elements of the fingerprint collection apparatus located inside the effective target area to be in an operation state, and second photosensitive elements of the fingerprint collection apparatus located outside the effective target area to be in a non-operation state;
obtaining, from the first photosensitive elements in the operation state, fingerprint information of the touch input; and
performing the fingerprint recognition process on the fingerprint information.

18. The electronic device according to claim 16, wherein the display screen is further configured to perform:
after the fingerprint collection apparatus is invoked, displaying a prompt area for instructing a user to provide the touch input to the fingerprint collection apparatus.

* * * * *